L. B. WHIPPLE.
STRUT LATHE.
APPLICATION FILED AUG. 4, 1919.
1,434,516.
Patented Nov. 7, 1922.
4 SHEETS—SHEET 1.
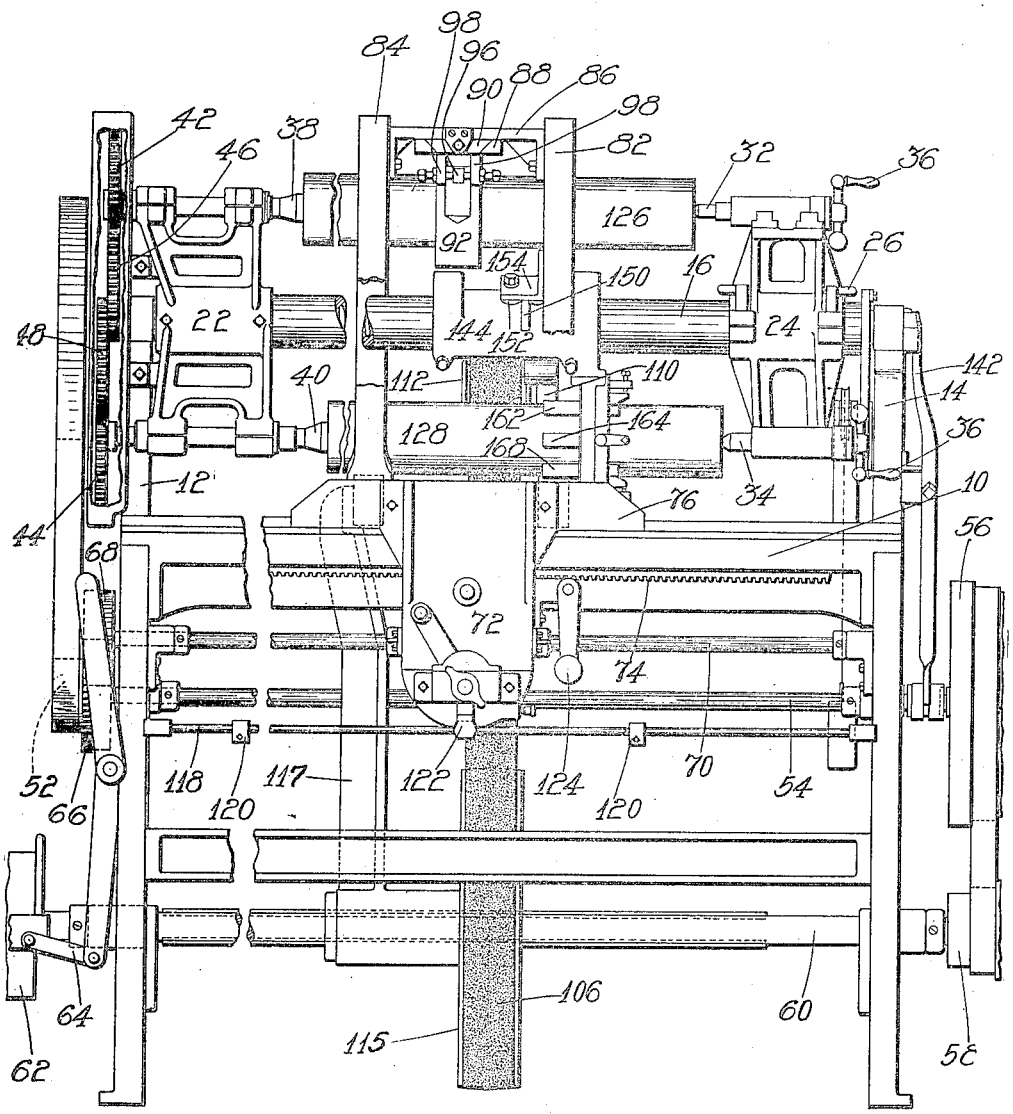
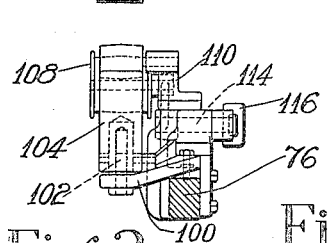
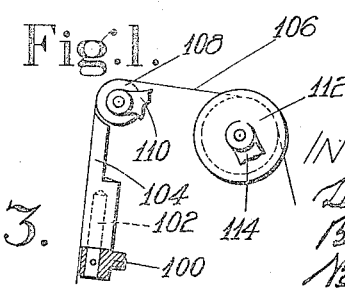
INVENTOR-
Leland B. Whipple
By his Attorney
Nelson W. Howard

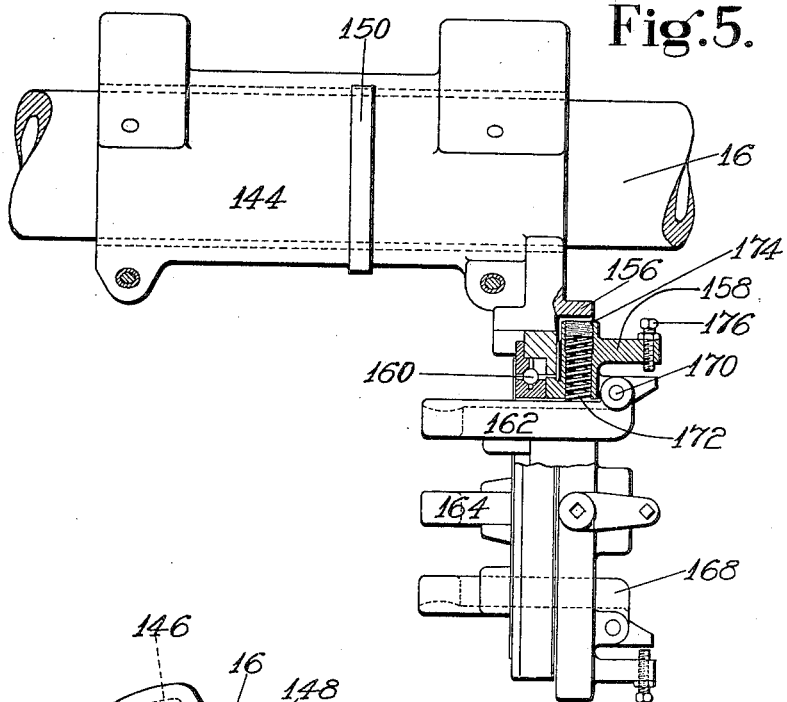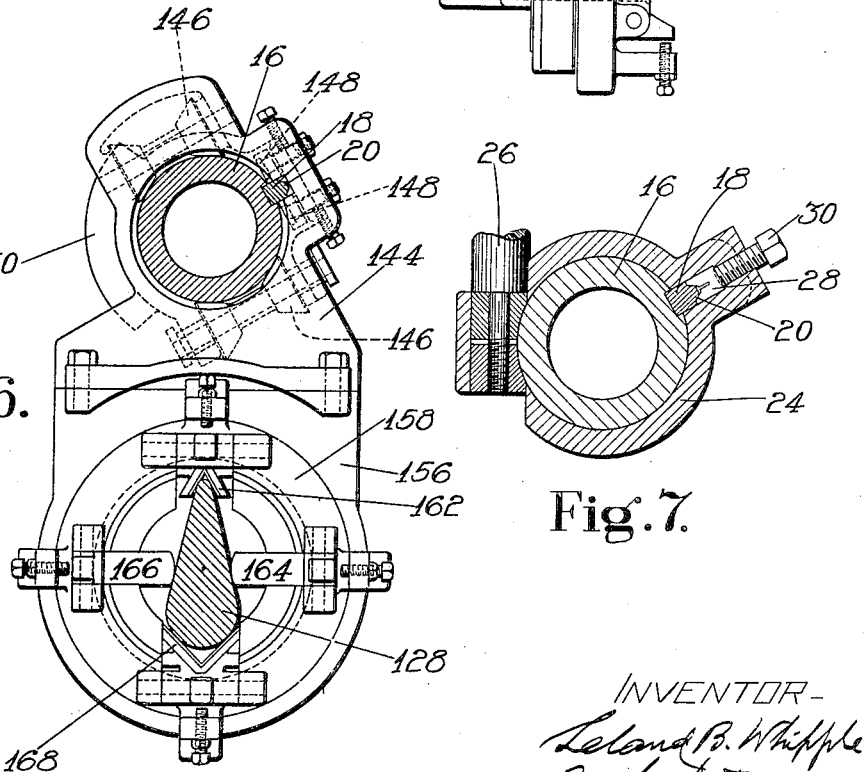

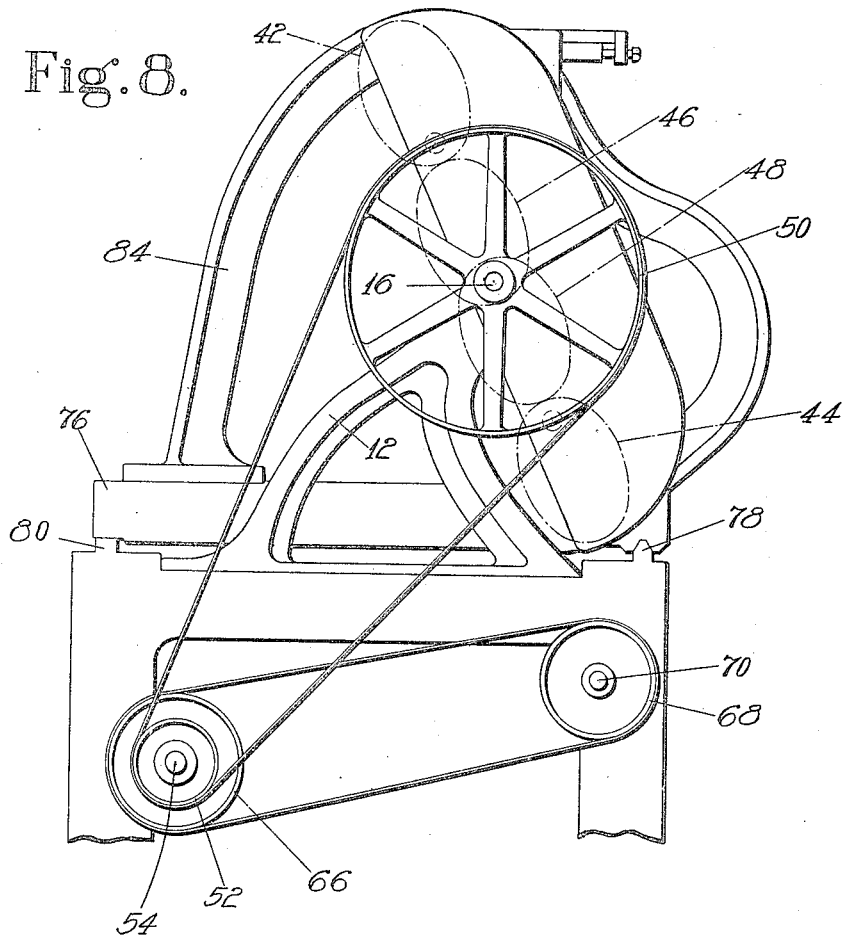

Patented Nov. 7, 1922.

1,434,516

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

STRUT LATHE.

Application filed August 4, 1919. Serial No. 315,084.

*To all whom it may concern:*

Be it known that I, LELAND B. WHIPPLE, a citizen of the United States, residing at Rochester, in the county of Monroe and State of New York, have invented certain Improvements in Strut Lathes, of which the following description, in connection with the accompanying drawings, is a specification, like reference characters on the drawings indicating like parts in the several figures.

This invention relates to the copy-turning of irregular objects, and is herein disclosed for illustrative purposes as embodied in a lathe especially designed for making airplane struts. An airplane strut is a wooden member, from two to ten feet long, of elongated ovoid cross-section, the size varying or not, as desired, throughout the length. Great difficulty has been experienced in forming these objects in a copying lathe due to their great length, the consequent massiveness of the machinery necessary to handle them, and the jar resulting from the reversal of movement of so much material in movement of the amplitude required by the elongated cross-section.

It has been found also that two operations are advisable in forming these objects, since the first or ordinary turning operation leaves the strut with a shallow helical groove upon it, which must be smoothed down. This smoothing operation is preferably done in a similar lathe wherein all the above described difficulties are met with, together with the additional one that the abrasive belt used tends to set the long strut in violent vibration as a violin bow does a string.

It is the object of the present invention to remove these difficulties among others, and to provide a machine which will produce accurate work rapidly and economically.

An important feature of the invention resides in a novel organization, including an oscillating frame comprising a circular tube carrying the model and work head and tail stocks. This construction minimizes the moment of inertia of the oscillating frame, and makes its reversal of movement easy and smooth as compared with other heretofore known types.

Another feature of the invention resides in a cradle for supporting the strut against lateral vibration. Preferably this cradle comprises a member encircling the strut, rotating with it, and supporting it on all sides. In the illustrated machine this member carries resilient fingers pressing against the sides of the strut.

Another feature of the invention is comprised in gearing for varying the rotational speed of the work during each revolution. This enables the flat and the sharply curved sides of the work which are, respectively, near to and far from the axis of revolution, to be treated at different angular speeds, so that the surface speeds can be equalized. A large part of the jar can also be eliminated by this construction.

Another important feature of the invention resides in a pair of substantially flat guides for use in a machine using a sand belt. A flat guide supporting the sand belt enables it to work more smoothly and without concentrating wear on individual points in it.

These and other features of the invention comprising certain details of construction and combinations of parts will be better understood from the following description of a preferred embodiment thereof shown in the accompanying drawings in which, Fig. 1 is a front elevation of the machine;

Fig. 2 is a front elevation of the sand belt supporting means;

Fig. 3 is a side elevation thereof;

Fig. 5 is a detail showing the cradle;

Fig. 6 is a side elevation of the parts shown in Fig. 5;

Fig. 7 is a cross-section of the tail-block clamp;

Fig. 8 is an end elevation of the left-hand end of the machine.

Figure 4:
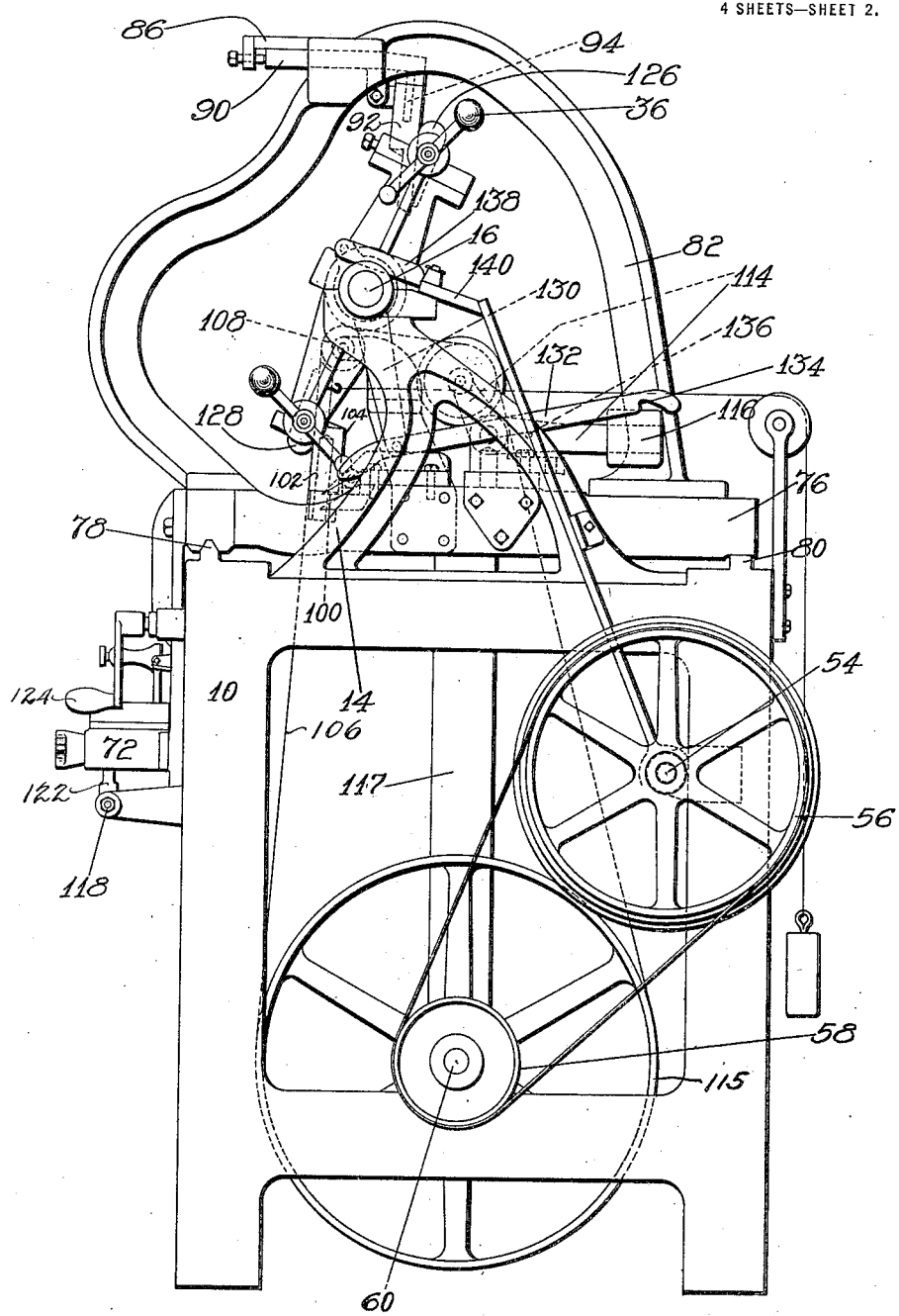
Fig. 4 is an elevation of the right-hand end of the machine.

The machine frame 10 carries two pedestals 12 and 14 at its ends in which are rotatably mounted the swing frame bed 16. This bed is preferably formed as a circular tube for reasons which will later appear. The tube contains a keyway in which is located a key 18 having a wedge-shaped rib 20 projecting from its outside surface. The bed carries a head-stock 22 and a tail-stock 24, the latter of which is slidable along the bed and may be clamped in any position by the screw clamps 26. The main body of the tail-stock has a recess fitting over the key 18 and containing a block or gib 28 which fits over the rib 20 and may be forced firmly down upon it by the screw 30 (see Fig. 7). The head-stock 22 is mounted in the same way upon the bed 16, and the key 18 and blocks 28 keep the two stocks rigidly in relative position as regards rotation, though permitting the tail-stock to be drawn up to or separated from the head-stock in order to fit different sizes of work. The tail-stock carries two dead spindles 32 and 34 which can be screwed in and out by handles 36. This part of the mechanism is of ordinary construction and need not be further described. The head-stock 22 carries two live spindles 38 and 40 which are driven by elliptical gears 42, 44, respectively, mounted upon their outer ends. These gears are driven by two equivalent elliptical gears 46, 48 which are integral with each other and rotatably mounted upon the axis of the bed 16, preferably outside of the pedestal 12. These gears are driven by a pulley 50 integrally mounted with respect to them. The pulley 50 is belted to a pulley 52 on the end of a shaft 54 upon the other end of which is a pulley 56 driven from a pulley 58 on the end of a shaft 60 upon the other end of which is a main receiving pulley 62 with a belt shifter 64. The shaft 54 also carries a pulley 66 which drives a pulley 68 upon a shaft 70 which drives gear mechanism of any desired type in an apron 72 causing the apron to drive along a rack 74 in either direction as desired, according to the adjustment of the mechanism in the apron, in order to drive the carriage 76 to which the apron is bolted. The carriage 76 slides upon guides 78 and 80 in the ordinary manner and carries two arches 82 and 84. The arches are connected above by a cross-bar 86 carrying a dove-tailed guide 88 in which is adjustably mounted a slide 90 carrying the model guide 92. The model guide is rotatably mounted about a nearly vertical spindle 94 and carries a lug 96 which is loosely confined between two set screws in ears 98 mounted upon the slide 90. The model guide is substantially flat instead of rounded, as I have found that this form produces better work upon airplane struts which, as shown in Fig. 4, are of elongated ovoid cross-section with two very nearly flat sides.

The bed 76 carries a bracket 100 upon which is mounted a spindle 102 similar to the spindle 94 and carrying a sand-belt guide 104 exactly similar to the model guide 94, but in reverse position. The sand-belt 106 passes over this guide and over a pulley 108 mounted upon an arm 110 which is a part of the bracket 100; and passes thence over a pulley 112 which is mounted on one end of a bell-crank 114 at the other end of which is a counterweight 116, the pulley 112 thus operating as a belt tightener for the sand-belt. From the belt tightener 112 the sand-belt 106 passes over a large drive pulley 115 which is splined upon the shaft 60 and rotatably mounted in an arm 117 which is rigidly bolted to the carriage 76. A rod 118 carries two knock-off blocks 120 which can be adjusted to contact with the knock-off arm 122 of the apron at any desired point to stop the carriage when running in either direction. The carriage may be shifted by hand when the apron mechanism is unclutched by means of the handle 124, which operates a small pinion (not shown) meshing with the rack 74. The mechanism thus far described is used as follows:—A model 126 is mounted between the spindles 38 and 32 and a rough-turned strut 128 is mounted between the spindles 34 and 40. The elliptical gears are so arranged with regard to the spindles that the spindles are rotated rapidly when the flat sides of the strut are in contact with the guides and are rotated slowly when the end portions of the cross-section are in contact with the guides. This equalizes the surface speed of the sand-belt over the work and I have found that the quality of the work is improved thereby as well as that the wear on the sand-belt is made more even and uniform. I have found also that the flat guides work much better with the sand belt than curved ones, such as the well-known model wheel, in that the action of the sand-belt is made more uniform over large areas instead of tending to cut too deeply in spots as is the case when a curved guide is used. The pivoted construction enables the guide to follow smoothly the changes in cross-section of the model and work, in case they exist.

The oscillating frame has at its right hand end an arm 130 to which is pivoted a bar 132 having a notch 134 at its rear end. When the oscillating frame is rotated clockwise in Fig. 4 to release the work and model from their engaging instrumentalities, the notch 134 falls over a pin 136 and holds the oscillating frame with the work and model disengaged. At the same time, a lug 138 mounted on the oscillating frame swings against the laterally projecting arm of a bell-crank 140 mounted on the pedestal 14 forcing the backwardly projecting arm thereof to the right. This backwardly projecting arm (Fig. 4) engages a lever 142, see Fig. 1, which disconnects the pulley 56 from the shaft 54, thereby shutting off all the power from the oscillating frame and the carriage drive.

I have found that the action of a sand-belt upon the work it treats is radically different from that of a cutter in that unbroken frictional contact over a large surface sets the strut into violent vibration. These members may be as long as ten or twelve feet and this action of the sand-belt, especially when near their middle portions, is sometimes such as to vitiate the entire accuracy of the operation. The action seems to be similar to that of a violin bow upon a string. I have obviated this difficulty as follows:—

A carrier 144 is mounted upon the tube 16. It contains roller bearings 146 which enable it to slide freely along the tube and other roller bearings 148 which engage the key 18 and prevent the carrier from rotating relatively to the tube 16. This carrier has a rib 150 which is engaged by rollers 152, one on each side, the rollers being mounted upon a bracket 154 fastened firmly to the arch 82. The movement of the carriage 76 communicated through the arch 82 is therefore communicated to the carrier 144 which is pulled along with the arches, guides and sand-belt. The carrier 144 has bolted to it a ring 156 in which is rotatably mounted a ring 158 by means of a ball bearing 160. This ring carries four fingers 162, 164, 166, 168, which are pivotally mounted as at 170 upon the ring 158 upon axes which are at right angles to the axis of the ring. These fingers are all spring-pressed toward the axis of the ring by springs 172 mounted in the ring 158 and adjustable by nuts 174. Set screws 176 prevent the fingers falling too far toward the axis of the ring. The fingers 162 and 168 are grooved as shown in Fig. 6 so that they will fit the ends of the strut. The fingers 164 and 166 have plain ends.

By the mechanism thus described, the strut is prevented from vibrating under the drag of the sand-belt, the four fingers confining it resiliently but still closely and contacting with it close to the sand-belt so that the strut is supported in all directions against vibration. I have also built machines of the illustrated type omitting the structure shown in Figs. 5 and 6 and substituting a model wheel of ordinary construction for the guide 92 and a cutter head for the sand-belt to perform the so-called rough turning operation upon the struts. This operation leaves a spiral groove perhaps a thirty-second of an inch deep around the strut and it is the finishing off of the resulting ridges for which the machine illustrated in Fig. 1 is designed. A round sand-wheel is inadvisable for strut finishing because it has less area than a belt and wears faster, and because it has a tendency to dig and finish unevenly in spots.

Attention should be called to the structure of the oscillating frame which is the same in both machines. The weight of this frame is largely concentrated at its center. The tube 16 in a certain machine I found to weigh 130 pounds while the head-stock and tail-stock, which were constructed of aluminum as far as possible, weighed about 75 pounds together. This concentration close to the axis makes the frame very responsive to the reaction between the model guide and the model so that it turns quickly and easily without tending to bend or distort the model and thereby vitiate the accuracy of reproduction of the work. It is obvious that in cutting an object ten feet long, seven or eight inches wide and two or three inches thick, the problem of bending the work and the model is a very serious one to overcome, and I have found after much experimenting that the saving of even a few pounds in the oscillating frame is of supreme importance. The tubular form of the main member of the oscillating frame enables me to use minimum mass of metal for a given strength and stiffness in the bed.

Having described my invention, what I claim as new and desire to secure by Letters Patent of the United States is:—

1. In a machine of the class described, two pedestals, a tube of circular cross-section rotatably supported in the pedestals, a head-stock frame mounted on the tube having two substantially identical spindles on opposite sides of and in the same plane with the tube, the tube being long as compared with the distance between the spindles, a tail-stock frame longitudinally adjustable along the tube and provided with two similarly arranged spindles, mechanism for rotating both head-stock spindles at the same speed, and a carriage arranged to move parallel to the tube, and carrying a model guide and a tool arranged on opposite sides of the tube and in similar relations to the two sets of corresponding stocks.

2. In a machine of the class described, a model holder and a work holder arranged to handle an object which is long as compared with its lateral dimensions, a model guide and an abrasive belt for treating the model and work, respectively, and a pressure plate for the belt shaped like the model guide and similarly arranged.

3. In a machine for turning airplane struts, a work holder and a model holder, a model guide comprising a flat plate, a work guide substantially identical in contour with the model guide and similarly arranged with regard to its co-operating instrumentalities, and an abrasive belt arranged to run between the work guide and the work.

4. In a machine for turning airplane struts, a work holder and a model holder, a model guide comprising a flat plate pivotally mounted upon an axis transverse to the axis of rotation of the model.

5. In a lathe for turning airplane struts, model and work holding and rotating means, and model and work following means, the latter comprising a cradle arranged to support the work in the neighborhood of the operating point of the tool, and to move along the work with the tool.

6. In a lathe for turning airplane struts, model and work holding and rotating means, and model and work following means, the latter comprising a cradle arranged to encircle and support the work in the neighborhood of the operating point of the tool, and to move along the work with the tool.

7. In a lathe for turning airplane struts, model and work holding and rotating means, and model and work following means, the latter comprising a cradle arranged to support the work in all directions in the neighborhood of the operating point of the tool, and comprising a resilient contact member for the work.

8. In a lathe for turning airplane struts, model and work holding and rotating means, and model and work following means, the latter comprising a cradle arranged to support the work in all directions in the neighborhood of the operating point of the tool, and comprising a resilient contact member for the work arranged to follow the tool along the work.

9. In a lathe for turning airplane struts, model and work holding and rotating means, and model and work following means, the latter comprising a cradle arranged to support the work in all directions in the neighborhood of the operating point of the tool, and comprising a resilient contact member for the work arranged to rotate with the work.

10. In a lathe for turning airplane struts, model and work holding and rotating means, and model and work following means, the latter comprising a cradle arranged to support the work in all directions in the neighborhood of the operating point of the tool and comprising a carrier, and a frame having a bearing in the carrier and arranged to encircle and support the work against vibration, and to rotate therewith in its bearing in the carrier.

11. In a lathe for turning airplane struts, model and work holding and rotating means, and model and work following means, the latter comprising a cradle arranged to support the work in all directions in the neighborhood of the operating point of the tool, and comprising a carrier, a frame having a bearing in the carrier and arranged to encircle and support the work against vibration, and to rotate therewith in its bearing in the carrier, the frame having resilient fingers constructed and arranged to press against the work in several directions.

12. In a machine for making airplane struts, a swing frame consisting of a tube oscillating on its axis and having a head-stock and tail-stock mounted thereon, said stocks comprising model and work spindles on opposite sides of the tube, a cradle longitudinally slidably mounted on said tube and arranged to swing with it, and constructed to support the work on all sides to prevent vibration, and a sand-belt arranged to treat the work in the neighborhood of the cradle.

13. In a machine for forming airplane struts, a swing frame for carrying and rotating the model and the work and variable speed gearing for rotating them at higher speed when operating upon their flat sides and at slower speed when operating upon their more sharply curved sides.

14. In a machine of the class described, an oscillating frame comprising a circular tube, a key having a wedge-shaped top mounted in a keyway on the tube, and a head-stock and tail-stock mounted on the tube for relative approach and separation, engaging the key and having a concave gib fitting over the wedge-shaped top of the key, means for rotating the stock spindles and model and work contacting instrumentalities constructed and arranged to traverse along the tube between the stocks.

In testimony whereof I have signed my name to this specification.

LELAND B. WHIPPLE.